(12) United States Patent
    Murugesan et al.

(10) Patent No.: US 10,129,439 B2
(45) Date of Patent: Nov. 13, 2018

(54) DYNAMICALLY COLOUR ADJUSTED VISUAL OVERLAYS FOR AUGMENTED REALITY SYSTEMS

(71) Applicant: GM Global Technology Operations LLC, Detroit, MI (US)

(72) Inventors: Prakash Murugesan, Toronto (CA); Shiv G. Patel, Brampton (CA); Michael A. Wuergler, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/078,282

(22) Filed: Mar. 23, 2016

(65) Prior Publication Data

US 2017/0280024 A1    Sep. 28, 2017

(51) Int. Cl.
    *H04N 1/60*     (2006.01)
    *H04N 5/33*     (2006.01)
    *G06F 3/01*     (2006.01)
    *G06T 11/60*    (2006.01)
    *G06T 19/00*    (2011.01)

(52) U.S. Cl.
    CPC ........... *H04N 1/6027* (2013.01); *G06F 3/013* (2013.01); *G06T 11/60* (2013.01); *G06T 19/006* (2013.01); *H04N 5/332* (2013.01)

(58) Field of Classification Search
    None
    See application file for complete search history.

(56) References Cited

U.S. PATENT DOCUMENTS

| | | | |
|---|---|---|---|
| 2011/0229023 A1* | 9/2011 | Jones | G06T 11/001 382/162 |
| 2012/0176570 A1* | 7/2012 | Yamazaki | G02F 1/1334 349/86 |
| 2012/0224062 A1* | 9/2012 | Lacoste | G01C 21/365 348/148 |
| 2013/0207896 A1* | 8/2013 | Robinson | G06F 3/013 345/158 |
| 2014/0361971 A1* | 12/2014 | Sala | G06F 3/041 345/156 |
| 2015/0356788 A1* | 12/2015 | Abe | A63F 13/428 345/633 |
| 2016/0225164 A1* | 8/2016 | Tomlin | G06T 15/04 |

* cited by examiner

*Primary Examiner* — Xin Sheng
(74) *Attorney, Agent, or Firm* — BrooksGroup

(57) ABSTRACT

A number of illustrative variations may include a method of producing augmented reality experience.

11 Claims, 3 Drawing Sheets

DYNAMICALLY COLOUR ADJUSTED VISUAL OVERLAYS FOR AUGMENTED REALITY SYSTEMS

TECHNICAL FIELD

The field to which the disclosure generally relates to includes augmented reality systems.

BACKGROUND

Augmented reality systems technologically augment perception of reality.

SUMMARY OF ILLUSTRATIVE VARIATIONS

A number of illustrative variations may include dynamically adjusting the color and pattern of augmented reality overlays to enhance the visibility of the overlaid information.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1A:
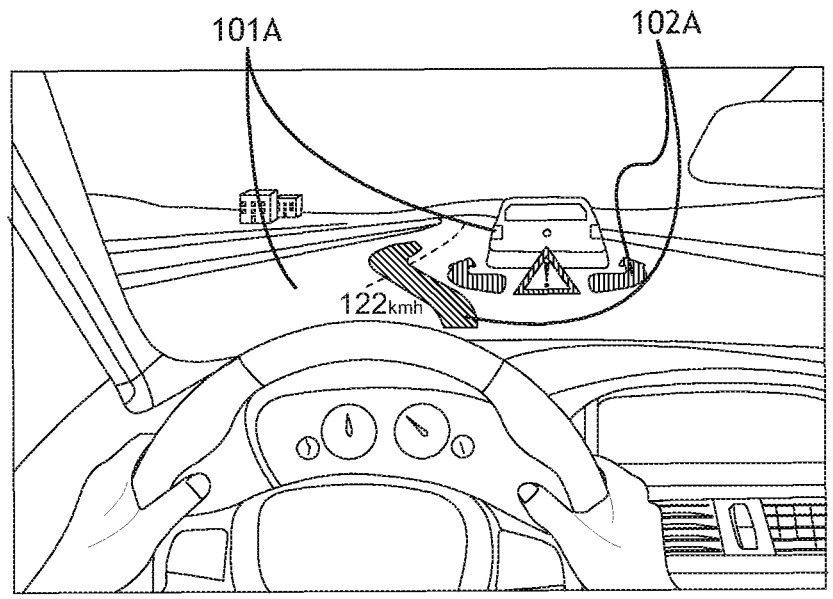
FIG. 1A illustrates a scenario in which the color of the augmented reality overlay should be adjusted in order to be more visible to a user.

The following description of the variations is merely illustrative in nature and is in no way intended to limit the scope of the invention, its application, or uses.

In a number of illustrative variations, an augmented reality system may use augmented reality overlays to convey information about objects in a user's view, to a user in an intuitive, visual format.

Referring to FIGS. 1A, 1B, 2A, 2B and 3, in a number of illustrative variations, an augmented reality system may include a display means 306 such as but not limited to a projector and display surface 308, or an electronic monitor or display 320. In such illustrative variations, the augmented reality system may include a first sensor 316 or camera 314 facing a direction that the user 302 will sometimes be facing, as well as a second sensor 312 or camera 310 facing the user. In such illustrative variation the sensors or cameras may be used selectively, and in concert with software, to dynamically overlay images on a display surface in the augmented reality user's line of sight.

In a number of illustrative variations, providing a first camera 310 or sensor 312 facing an augmented reality system user 302; providing a second camera 314 or sensor 316 facing a viewpoint to be augmented; using the first camera 310 or sensor 312 to detect or estimate an augmented reality system user's gaze; using the second camera 314 or sensor 316 to detect or estimate the viewpoint to be augmented; using a controller 318 to produce viewpoint overlays, in light of the system user's gaze, which may be displayed in the augmented reality user's line of sight via a display medium 308; and, displaying the image overlays in the augmented reality user's line of sight via a display medium 308.

In a number of illustrative variations, the camera 310 facing the user 302 may be used to detect or estimate the user's gaze by correlating data including but not limited to the user's face orientation, the user's distance from the camera 310 or display 320 or display surface 308, the user's viewing angle, the user's pupil size, the user's line of sight, the user's eye orientation, and the user's eye-lid positions.

In a number of illustrative variations, a camera 314 or sensor 316 facing the direction the user is facing may be used in concert with software to detect or estimate the colors, texture, and patterns on the objects in the field of capture of the camera 314 or sensor 316.

In a number of illustrative variations, a camera 310 facing a direction that the user will sometimes be facing may be used in conjunction with a controller 318 to rapidly capture and analyze images. The analysis may focus on areas of the image that have been determined to be areas in which an image overlay showed be placed.

In a number of illustrative variations, a vehicle operator may also be the augmented reality system user. In such illustrative variations, the vehicle operator 302 may be positioned in front of a steering wheel 304 and may be gazing through the windshield 308 of the vehicle 300, toward a path of travel of the vehicle. A first camera 310 or sensor 312 facing the vehicle operator 302 may be used to detect the vehicle operator's gaze. Concurrently, a second camera 314 or sensor 316, which faces the general direction in which operator is gazing, may be used to detect objects in the vehicle operator's gaze. The images gathered from the first camera 310 or sensor 312 and second camera 314 or sensor 316 may be correlated to produce visual overlays that may be interposed between the vehicle operator and any potential focal point of the vehicle operator's gaze. The visual overlays may be used to indicate the vehicle or vehicle operator's current proximity to an object, the speed or velocity of a moving entity as well as warnings, notifications, alerts, heads-up information, or any other type of information useful to a vehicle operator 302 while operating a vehicle 300. In such illustrative variations, the visual overlays may be used to augment the vehicle user's viewpoint by interposing the overlays between the vehicle operator and any potential focal point of the vehicle operator's gaze on a transparent medium such as a window or the windshield 308 via some suitable display method such as projection. The visual overlays may also be interposed between the vehicle operator and any potential focal point of the vehicle operator's gaze via some non-transparent medium such as a display screen.

In a number of illustrative variations, the display means may dynamically change the color, arrangement, pattern, shape, or format of the visual overlays displayed.

Figure 1B:
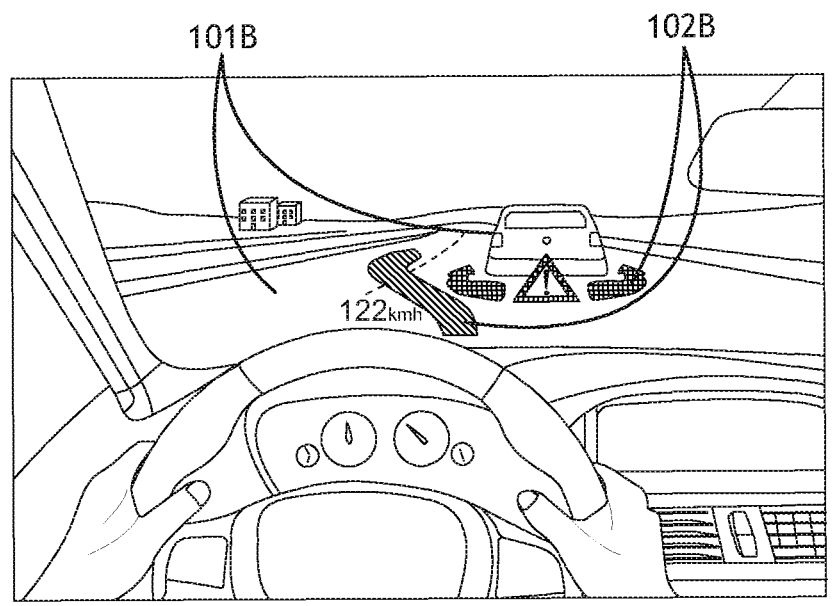
FIG. 1B illustrates a scenario in which the color of the augmented reality overlay has been adjusted in order to be more visible to a user.

Referring now to the illustrative variation shown in FIG. 1A, a vehicle operator may encounter a situation in which the current color of one or more visual overlays 101A may visually blend into the color, pattern, or texture of any number of entities 102A which may be a potential focal point of the vehicle operator's gaze. In such a case, and as illustrated in FIG. 1B, the color and pattern of any number of the visual overlays 101B may be changed so that at least one of the visual overlays does not blend into the color, pattern, or texture of the entity 102B being overlaid.

Figure 2A:
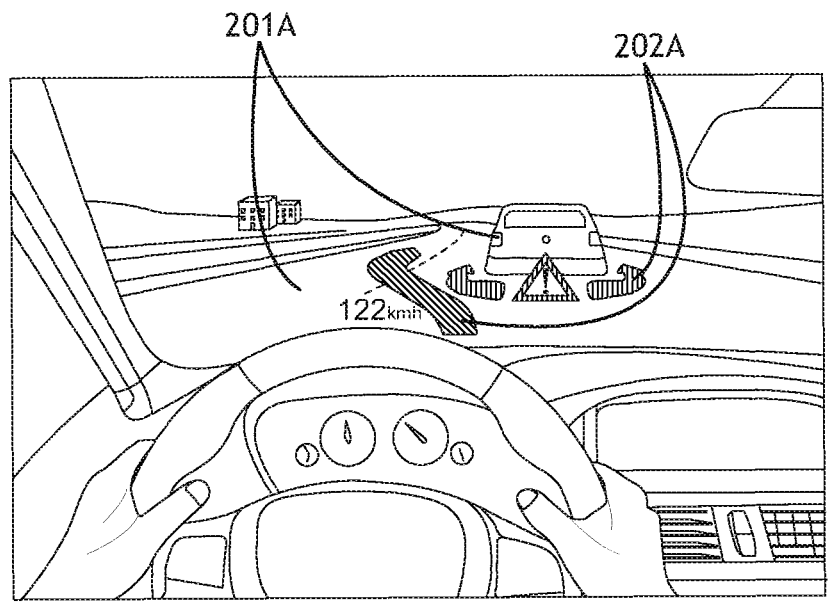
FIG. 2A illustrates a scenario in which the pattern of the augmented reality overlay should be adjusted in order to be more visible to a user.
Figure 2B:
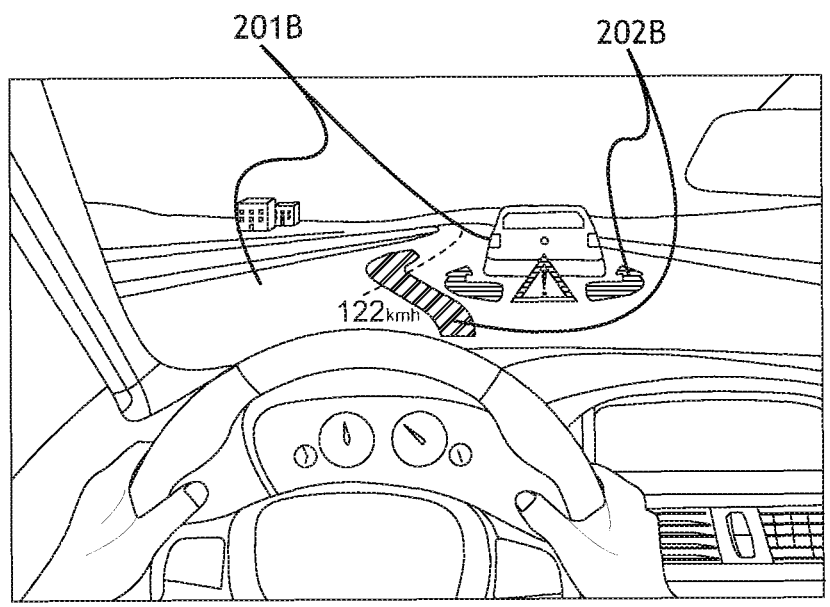
FIG. 2B illustrates a scenario in which the pattern of the augmented reality overlay has been adjusted in order to be more visible to a user.
Figure 3:
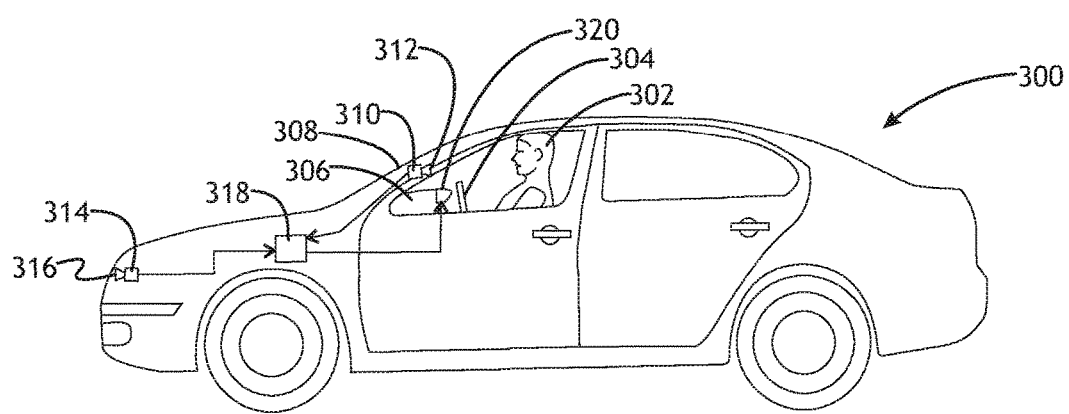
FIG. 3 is a schematic illustration of a product according to a number of variations.

Referring now to the illustrative variation shown in FIG. 2A, a vehicle operator may encounter a situation in which the current pattern of one or more visual overlays 201A may visually blend into the color, pattern, or texture any number of entities 202A which may be a potential focal point of the vehicle operator's gaze. In such a case, and as illustrated in FIG. 2B, the pattern of any number of the visual overlays 201B may be changed so that at least one of the visual overlays does not blend into the color, pattern, or texture of the entity 202B being overlaid.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method comprising: providing a first camera 310 or sensor 312 facing an augmented reality system user 302; providing a second camera 314 or sensor 316 facing a viewpoint to be augmented; using the first camera 310 or sensor 312 to detect or estimate an augmented reality system user's gaze; using the second camera 314 or sensor to detect or estimate the viewpoint to be augmented; using a controller 318 to produce viewpoint overlays, in light of the system user's gaze, which may be displayed in the augmented reality user's line of sight via a display medium 308, 320; and, displaying the image overlays in the augmented reality user's line of sight via a display medium 308.

Variation 2 may include the method of variation 1 wherein displaying the image overlays in the augmented reality user's line of sight via a display medium comprises interposing the image overlays between augmented reality system user and the view to be augmented via the display medium.

Variation 3 may include the method of variation 1 wherein using a controller to produce view overlays, in light of the system user's gaze, which may be displayed between the augmented reality user and the view to be augmented via a display medium includes adaptively adjusting the appearance of the image overlays in light of the user's gaze.

Variation 4 may include the method of variation 3 wherein adaptively adjusting the appearance of the view overlays in light of the user's gaze comprises using a camera or sensor to detect or estimate the color of an object in the user's gaze over which an overlay will be displayed, and adjusting the color of the view overlay to be a color which will not blend in with the detected or estimated object color.

Variation 5 may include the method of variation 4 wherein detecting or estimating the color of an object in the user's gaze near or over which a view overlay will be displayed comprises using a sensor 316 to detect the color of the object.

Variation 6 may include the method of variation 5 wherein the sensor is a light sensor.

Variation 7 may include the method of variation 6 wherein the light sensor is an infrared light sensor.

Variation 8 may include the method of variation 3 wherein adaptively adjusting the appearance of the view overlays in light of the user's gaze comprises using a camera to create an image including the color of an object in the user's gaze near or over which a view overlay will be displayed, analyzing the image to determine an appropriate color for the image overlay, and adjusting the color of the image overlay to be a color which will not blend in with the object color in the image.

Variation 9 may include the method of variation 3 wherein adaptively adjusting the appearance of the view overlays in light of the user's gaze comprises using a camera or sensor to detect or estimate the pattern or texture of on an object in the user's gaze over which an overlay will be displayed, and adjusting the pattern fill of the view overlay to be a pattern which will not blend in with the detected or estimated object pattern or texture.

Variation 10 may include the method of variation 3 wherein adaptively adjusting the appearance of the view overlays in light of the user's gaze comprises using a camera to create an image including the pattern or texture of an object in the user's gaze near or over which a view overlay will be displayed, and adjusting the pattern of the image overlay to be a pattern which will not blend in with the object pattern or texture in the image.

Variation 11 may include the method of variation 1 wherein the display medium is glass.

Variation 12 may include the method of variation 11 wherein the glass is a window.

Variation 13 may include the method of variation 1 wherein the display medium is an electronic display.

The above description of select variations within the scope of the invention is merely illustrative in nature and, thus, variations or variants thereof are not to be regarded as a departure from the spirit and scope of the invention.

What is claimed is:

1. A method comprising:
providing a vehicle including a windshield;
providing a first camera or sensor facing an augmented reality system user;
providing a second camera or sensor facing a viewpoint to be augmented;
using the first camera or sensor to detect or estimate an augmented reality system user's gaze through the windshield toward a direction of travel of the vehicle;
using the second camera or sensor to detect or estimate the viewpoint to be augmented;
using a controller to produce viewpoint overlays, in light of the system user's gaze, which are displayed in the augmented reality user's line of sight via a display medium;
using the first camera or sensor to detect or estimate the color or pattern of an object at a focal point of the user's gaze through the windshield;
detecting that at least one viewpoint overlay of the same or similar color or pattern is interposed or will be interposed in the user's gaze in front of or nearly in front of the object at the focal point of the user's gaze through the windshield toward a direction of travel of the vehicle;

adjusting the color or pattern of the viewpoint overlay to be a color which will not blend in with the detected or estimated object color or pattern; and displaying the viewpoint overlays in the augmented reality user's line of sight on the windshield via the display medium, wherein in the viewpoint overlay includes information including at least one of warnings, notifications, alerts, heads-up information or information useful to a vehicle operator while operating the vehicle.

2. The method of claim 1 wherein displaying the viewpoint overlays in the augmented reality user's line of sight via a display medium comprises interposing the image overlays between augmented reality system user and the focal point of the user's gaze via the display medium.

3. The method of claim 1 wherein using a controller to produce viewpoint overlays, in light of the system user's gaze, which are displayed between the augmented reality user and the view to be augmented via a display medium includes dynamically adjusting the appearance of the viewpoint overlays in light of the user's gaze.

4. The method of claim 3 wherein dynamically adjusting the appearance of the viewpoint overlays in light of the user's gaze comprises using a camera to create an image including the color or pattern of an object in the user's gaze near or over which a viewpoint overlay will be displayed, analyzing the image to determine an appropriate color or pattern for the image overlay, and adjusting the color or pattern of the image overlay to be a color which will not blend in with the object color in the image.

5. The method of claim 3 wherein dynamically adjusting the appearance of the viewpoint overlays in light of the user's gaze comprises using a camera or sensor to detect or estimate the pattern or texture of on an object in the user's gaze near or over which an overlay will be displayed, and adjusting the pattern fill of the viewpoint overlay to be a pattern which will not blend in with the detected or estimated object pattern or texture.

6. The method of claim 3 wherein dynamically adjusting the appearance of the viewpoint overlays in light of the user's gaze comprises using a camera to create an image including the pattern or texture of an object in the user's gaze near or over which a viewpoint overlay will be displayed, and adjusting the pattern of the image overlay to be a pattern which will not blend in with the object pattern or texture in the image.

7. The method of claim 1 wherein detecting or estimating the color or pattern of an object at the focal point of the user's gaze comprises using a sensor to detect the color or pattern of the object.

8. The method of claim 7 wherein the sensor is a light sensor.

9. The method of claim 8 wherein the light sensor is an infrared light sensor.

10. The method of claim 1 wherein the display medium is glass.

11. The method of claim 1 wherein the display medium is an electronic display.

* * * * *